April 29, 1924.
L. BEEMAN
PRESSED METAL WHEEL
Filed Aug. 9, 1922
1,492,416
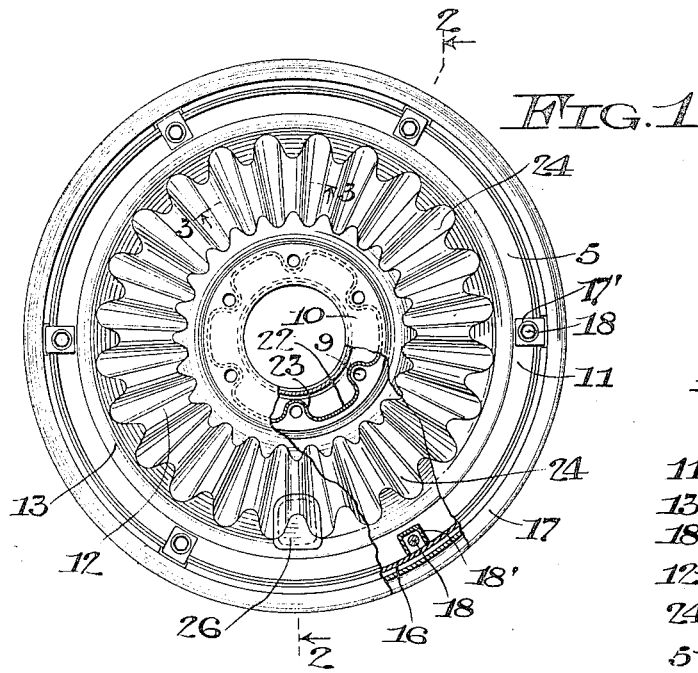
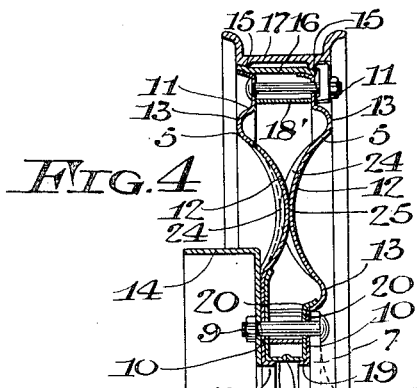
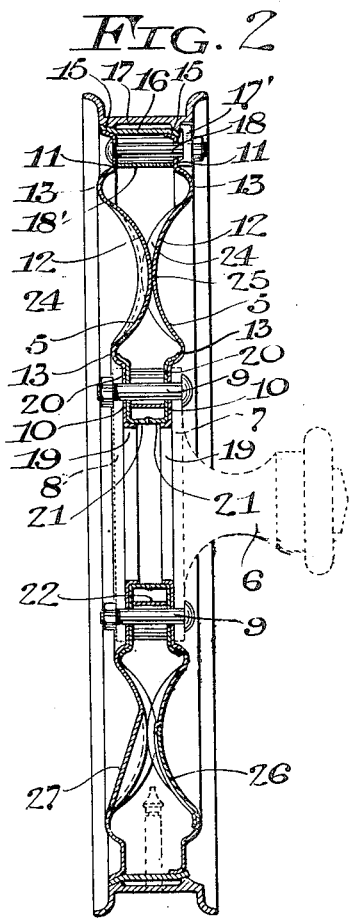
WITNESSES
INVENTOR
Lyle Beeman,
ATTORNEY Patented Apr. 29, 1924.

1,492,416

UNITED STATES PATENT OFFICE.

LYLE BEEMAN, OF MILWAUKEE, WISCONSIN.

PRESSED METAL WHEEL.

Application filed August 9, 1922. Serial No. 580,669.

*To all whom it may concern:*

Be it known that I, LYLE BEEMAN, a citizen of the United States, and resident of Milwaukee, in the county of Milwaukee and State of Wisconsin, have invented new and useful Improvements in Pressed Metal Wheels, of which the following is a description, reference being had to the accompanying drawings which are a part of this specification.

The invention relates to pressed metal wheels.

The object of the invention is to provide a wheel of the metal disk type in which the wheel is formed by a pair of pressed steel disks which are specially formed to provide a very strong web construction.

With the above and other objects in view the invention consists in the construction and the features of construction hereinafter described and all equivalents.

In the drawings: Fig. 1 is a side elevation view of a wheel embodying the invention, parts being broken away and parts being shown in section; Fig. 2 is a section taken on the line 2—2 of Fig. 1; Fig. 3 is a detail sectional view through the web of the wheel, taken on the line 3—3 of Fig. 1; Fig. 4 is a detail sectional view similar to Fig. 2 showing a modification of one of the disks to take the brake drum.

Generally complementary metal disks 5 are secured to the wheel hub 6, said disks having a hub portion, web portion and rim portion.

The hub 6 of the wheel is of usual construction, having flanges 7 and 8 through which bolts 9 pass, said bolts serving to clamp the disk wheel to the hub of either the front or rear wheel. The hub 7 is preferably of the type used on wooden wheels where the flanges are spaced apart, the thickness of wooden spokes, so that it is not necessary to provide a special hub construction.

Each of the disks 5 has an annular hub portion 10 and an annular rim portion 11 parallel to the plane of rotation, a concavo-convex intermediate or web portion 12 and curved portions 13 connecting the portions 12 with the portions 10 and 11, though where a brake drum 14 is secured to the wheel, the curved portion 13 is preferably omitted, as shown in Fig. 4. These curved portions 13 serve to reinforce the web portions of the disks and increase the bearing area of the disks at the hub and rim portions to better resist the loads or strains to which the disks are subjected.

The disks 5 have peripheral flanges 15 secured by welding, brazing or other well known methods to the usual wheel rim 16. The usual type of demountable rim 17 is secured to the rim 16 by clamping blocks 17' held in clamping engagement with the rim 17 by bolts 18 passing through the rim portions 11 of the disks 5. Thus the tires may be taken off or replaced upon the steel wheel in the manner usually employed. Channel blocks 18' between the disks 5 where the bolts 18 pass through serve as reinforcement for the rim portion.

The hub portions of the disks have inwardly extending annular flanges 19. The hub portion of the wheel and the curved portion or portions 13 adjacent said hub are preferably reinforced by disks 20 shaped to abut against the hub portions and curved portions of the disks 5 and provided with inwardly extending flanges 21, here shown as having a welded or brazed butt joint connection but they may be secured together with a lap joint. The disks 20 are preferably spot welded to the disks 5 at the curved portion 13. The annular flanges 19 fit closely against the flanges 21 of the disks 20. To further reinforce the hub portion of the wheel, I provide a spreader ring 22 which is formed to provide channel-shaped portions 23 adjacent the hub bolts 9 and is interposed between the disks 20.

In order that the web portion of the wheel may better resist the strains and stresses to which it is subjected, and in order to make it very strong for any given cross section of metal, I corrugate the concavo-convex web portions of the disks so that the corrugated portion extends annularly about the web portions of said disks. These corrugations 24 of adjacent disks are preferably of curved crescent-shaped formation and extend radially of the disks, and they interfit and abut against each other, as at 25 in the central part of the web portion, and where they abut they are preferably spot welded, Fig. 3 showing a section taken on a curved line in the central part of the web.

For access to the tire valve, an opening is provided in one of the disks 5 covered by a cap plate 26 and a part 27 of the opposite disk is flattened out adjacent this opening so as to provide clearance for attaching the air hose.

I desire it to be understood that this invention is not to be limited to any specific form or arrangement of parts except in so far as such limitations are specified in the claims.

What I claim as my invention is:

1. In a metal disk wheel, the combination of a pair of disks having hub, rim and web portions, the web portions of the disks being concavo-convexly curved and provided with radially extending corrugations, portions of the corrugated part of one disk interfitting with and secured to portions of the corrugated part of the other disk.

2. In a metal disk wheel, the combination, of a pair of disks having hub portions, rim portions and concavo-convexly curved radially corrugated web portions, the web portions curving inwardly where they join the rim portions.

3. In a metal disk wheel, the combination, of a pair of disks having hub portions, rim portions and concavo-convexly curved radially corrugated web portions, the web portions curving inwardly where they join the hub and rim portions, and reinforcing disks abutting the hub portions and the inwardly curved parts of said first named disks adjacent the hub.

4. In a metal disk wheel, the combination of a pair of disks having hub portions, rim portions and concavo-convexly curved radially corrugated web portions, the web portions curving inwardly where they join the hub and rim portions, and means for reinforcing the hub and rim portions of said disks.

5. In a metal disk wheel, the combination of a pair of disks connected together and having hub, rim and web portions, the web portions of the disks being concavo-convexly curved and provided with radially extending corrugations, the rim portions of the disks being spaced from and parallel to each other and to the plane of rotation, and the hub portions of the disks being spaced from and parallel to each other and to the plane of rotation.

6. In a metal disk wheel, the combination of a pair of disks having hub portions, rim portions and concavo-convexly curved radially corrugated web portions, the rim portions of the disks being spaced from and parallel to each other and to the plane of rotation, the hub portions of the disks being spaced from and parallel to each other and to the plane of rotation, and the web portions curving inwardly where they join the rim portions.

7. In a metal disk wheel, the combination of a pair of disks having hub, rim and web portions, the web portions of the disks being concavo-convexly curved and provided with radially extending corrugations, portions of the corrugated part of one disk interfitting with and secured to portions of the corrugated part of the other disk, and means for reinforcing the hub and rim portions of said disks.

8. In a metal disk wheel, the combination of a pair of disks having hub portions, rim portions and concavo-convexly curved web portions, the web portions being provided with crescent-shaped radially disposed corrugations contacting with each other and secured together at contacting points in the central part of the web of the wheel.

9. In a metal disk wheel, the combination of a pair of disks having hub, rim and web portions, the web portions of the disks being concavo-convexly curved and provided with radially extending corrugations.

In testimony whereof, I affix my signature.

LYLE BEEMAN.